United States Patent
Orhanovic

(10) Patent No.: US 11,530,978 B2
(45) Date of Patent: Dec. 20, 2022

(54) DEVICE AND METHOD FOR PLACING COMPONENTS

(71) Applicant: Totems Position Sarl, Cormondrèche (CH)

(72) Inventor: Toni Orhanovic, Cormondrèche (CH)

(73) Assignee: Totems Position SARL, Dombresson (CH)

( * ) Notice: Subject to any disclaimer, the term of this patent is extended or adjusted under 35 U.S.C. 154(b) by 0 days.

(21) Appl. No.: 17/047,991

(22) PCT Filed: Apr. 15, 2019

(86) PCT No.: PCT/IB2019/053078
§ 371 (c)(1),
(2) Date: Oct. 15, 2020

(87) PCT Pub. No.: WO2019/202466
PCT Pub. Date: Oct. 24, 2019

(65) Prior Publication Data
US 2021/0140873 A1    May 13, 2021

(30) Foreign Application Priority Data

Apr. 17, 2018 (CH) .................................. 00485/18
Sep. 24, 2018 (CH) .................................. 01158/18

(51) Int. Cl.
*G01N 21/01* (2006.01)
*G01B 7/31* (2006.01)

(52) U.S. Cl.
CPC ............... *G01N 21/01* (2013.01); *G01B 7/31* (2013.01); *G01N 2021/0106* (2013.01); *G01N 2201/021* (2013.01)

(58) Field of Classification Search
CPC .......... G01N 21/01; G01N 2021/0106; G01N 2201/021; G01B 7/31; G01B 5/0002; G02B 21/26
(Continued)

(56) References Cited

U.S. PATENT DOCUMENTS 3,442,581 A * 5/1969 Porazinski ........... G03B 21/116 353/78
3,645,611 A * 2/1972 Smith .................. G03B 21/116 353/23

(Continued)

FOREIGN PATENT DOCUMENTS

CN    1388891 A    1/2003
CN    1566971 A    1/2005
(Continued)

OTHER PUBLICATIONS

International Search Report for PCT/IB2019/053078, dated Jul. 30, 2019, 12 pages.

*Primary Examiner* — Roy M Punnoose
(74) *Attorney, Agent, or Firm* — Blank Rome LLP

(57) ABSTRACT

A positioning support (1) for positioning components to be inspected during their inspection by means of an optical control apparatus, comprising a chasing base (3) acting as interface to the optical control apparatus, a sliding base (5) able to slide along an axis "Y" in a plane of the chasing base perpendicular to the optical axis; a plate (7) able to slide along an axis "X" perpendicular to the axis "Y" in a plane parallel to said sliding base; jigs or bars (15) for positioning a plurality of components to be measured on said plate.

17 Claims, 16 Drawing Sheets

(58) Field of Classification Search
USPC .......................................................... 356/244
See application file for complete search history.

(56) References Cited

U.S. PATENT DOCUMENTS

| | | | |
|---|---|---|---|
| 4,579,431 A | 4/1986 | Ansel et al. | |
| 4,836,667 A * | 6/1989 | Ozeki | G02B 21/24 |
| | | | 359/398 |
| 5,171,963 A * | 12/1992 | Saruta | G05B 19/401 |
| | | | 219/121.69 |
| 5,367,401 A * | 11/1994 | Saulietis | G02B 21/26 |
| | | | 359/398 |
| 5,763,965 A | 6/1998 | Bader | |
| 6,671,041 B2 * | 12/2003 | Okahira | G01N 21/958 |
| | | | 356/237.1 |
| 6,707,546 B2 * | 3/2004 | Okahira | G01N 21/958 |
| | | | 356/239.1 |
| 7,682,573 B1 * | 3/2010 | DeBolt | G02B 21/34 |
| | | | 422/534 |
| 2002/0122178 A1 | 9/2002 | McMurtry et al. | |
| 2011/0266931 A1 | 11/2011 | Eric et al. | |
| 2013/0008266 A1 * | 1/2013 | Houjou | G02B 21/26 |
| | | | 73/864.91 |
| 2013/0015040 A1 | 1/2013 | Leroux et al. | |

FOREIGN PATENT DOCUMENTS

| | | | | |
|---|---|---|---|---|
| CN | 109406538 A | * | 3/2019 | |
| DE | 19601018 A1 | | 8/1996 | |
| EP | 2317042 A1 | | 5/2011 | |
| FR | 2530042 A1 | | 1/1984 | |
| FR | 2957904 A1 | | 9/2011 | |
| GB | 1323300 A | | 7/1973 | |
| KR | 20180063027 A | * | 6/2018 | |
| TW | 396483 B | | 7/2000 | |
| WO | WO-2009126903 A1 | * | 10/2009 | ................ B01L 9/52 |
| WO | WO-2011115127 A1 | * | 9/2011 | ............ C12M 23/10 |

* cited by examiner

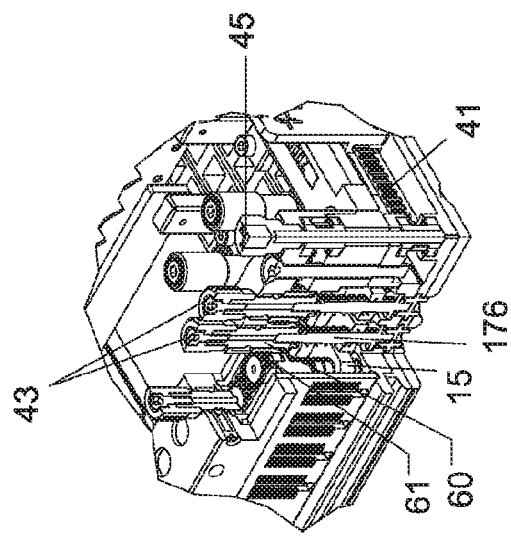
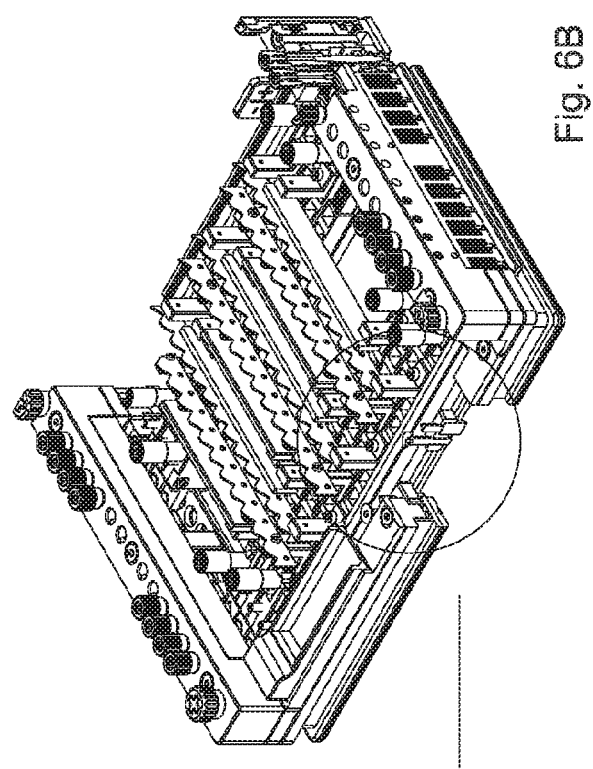
Fig. 6B
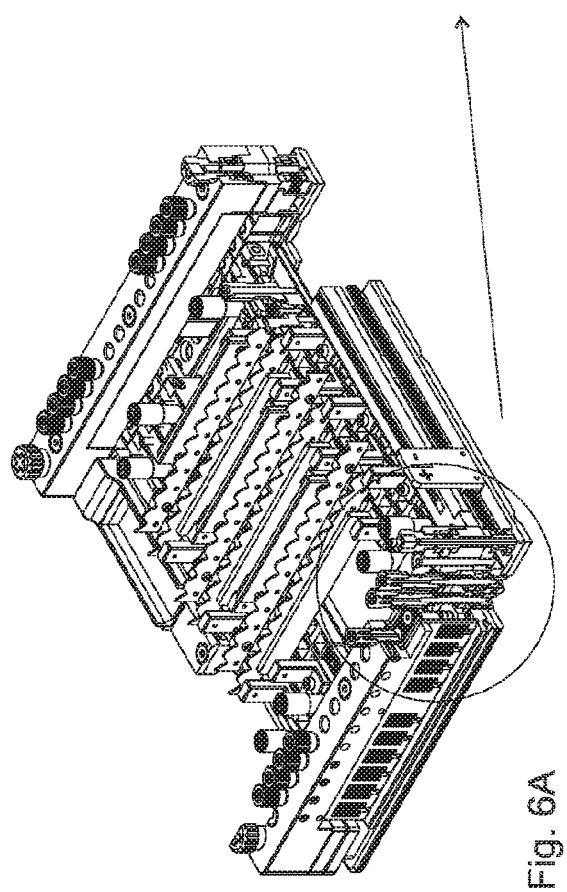
Fig. 6A
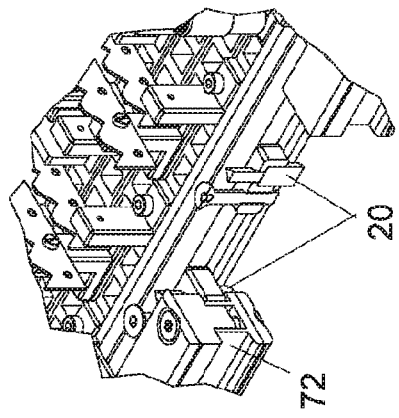

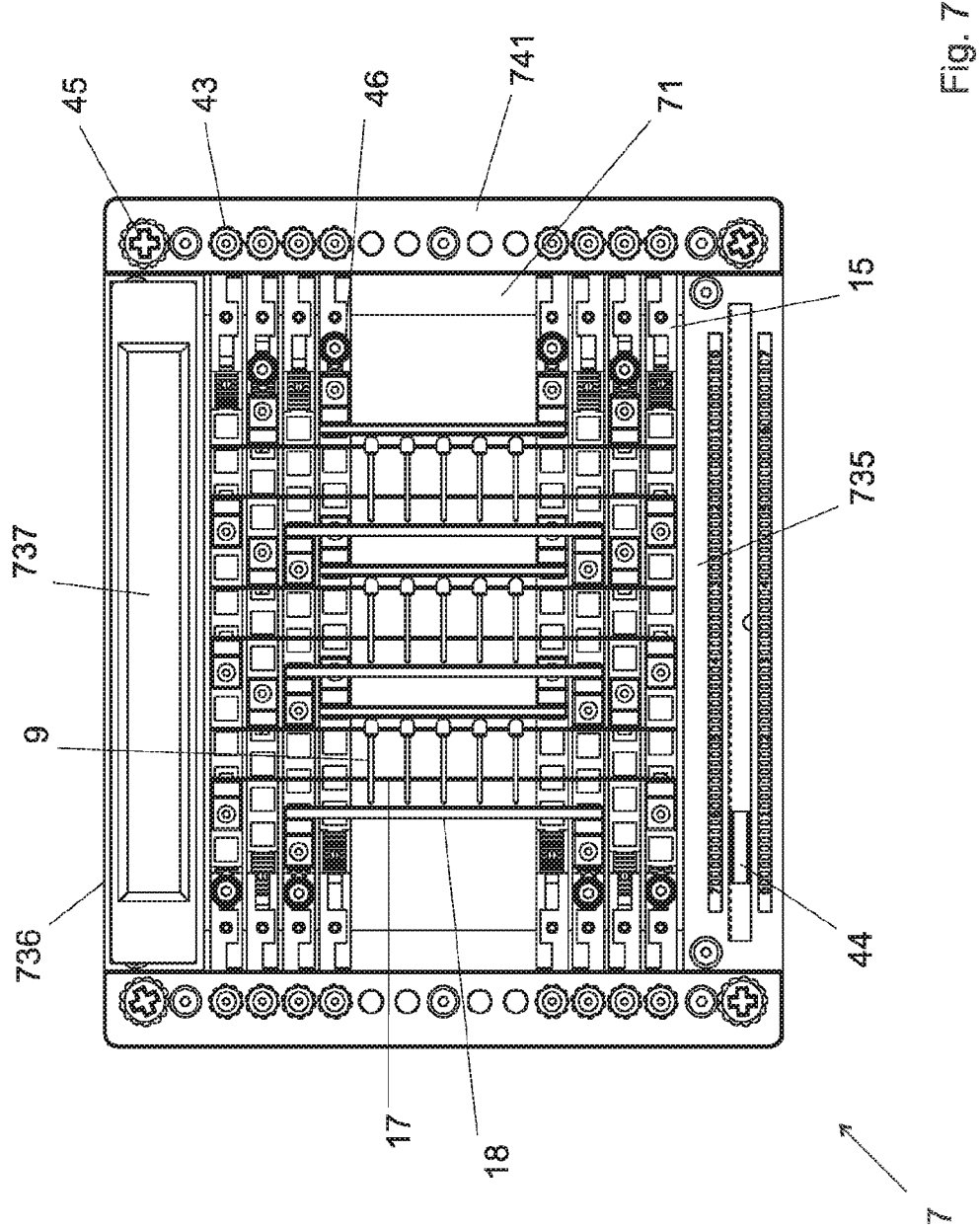

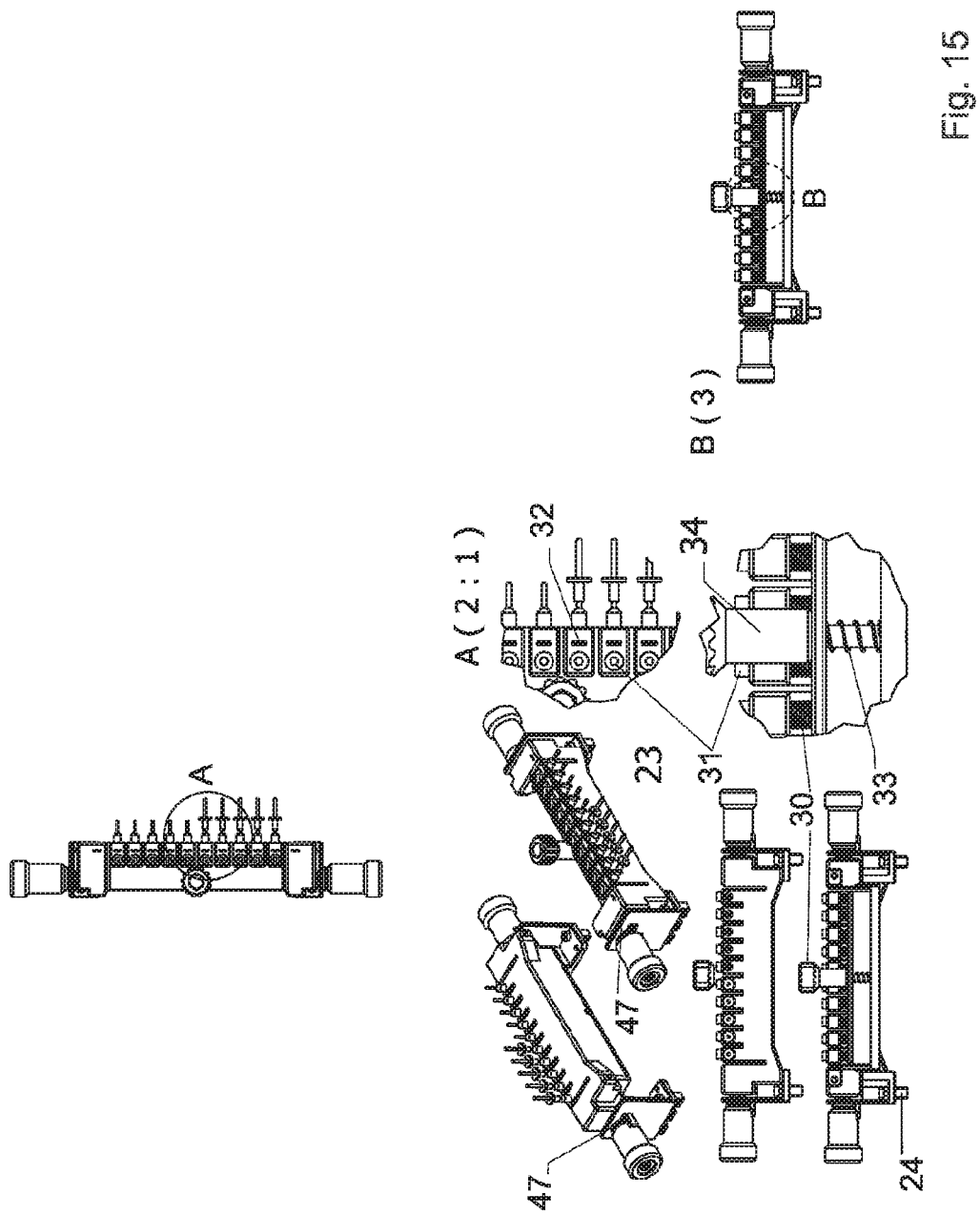

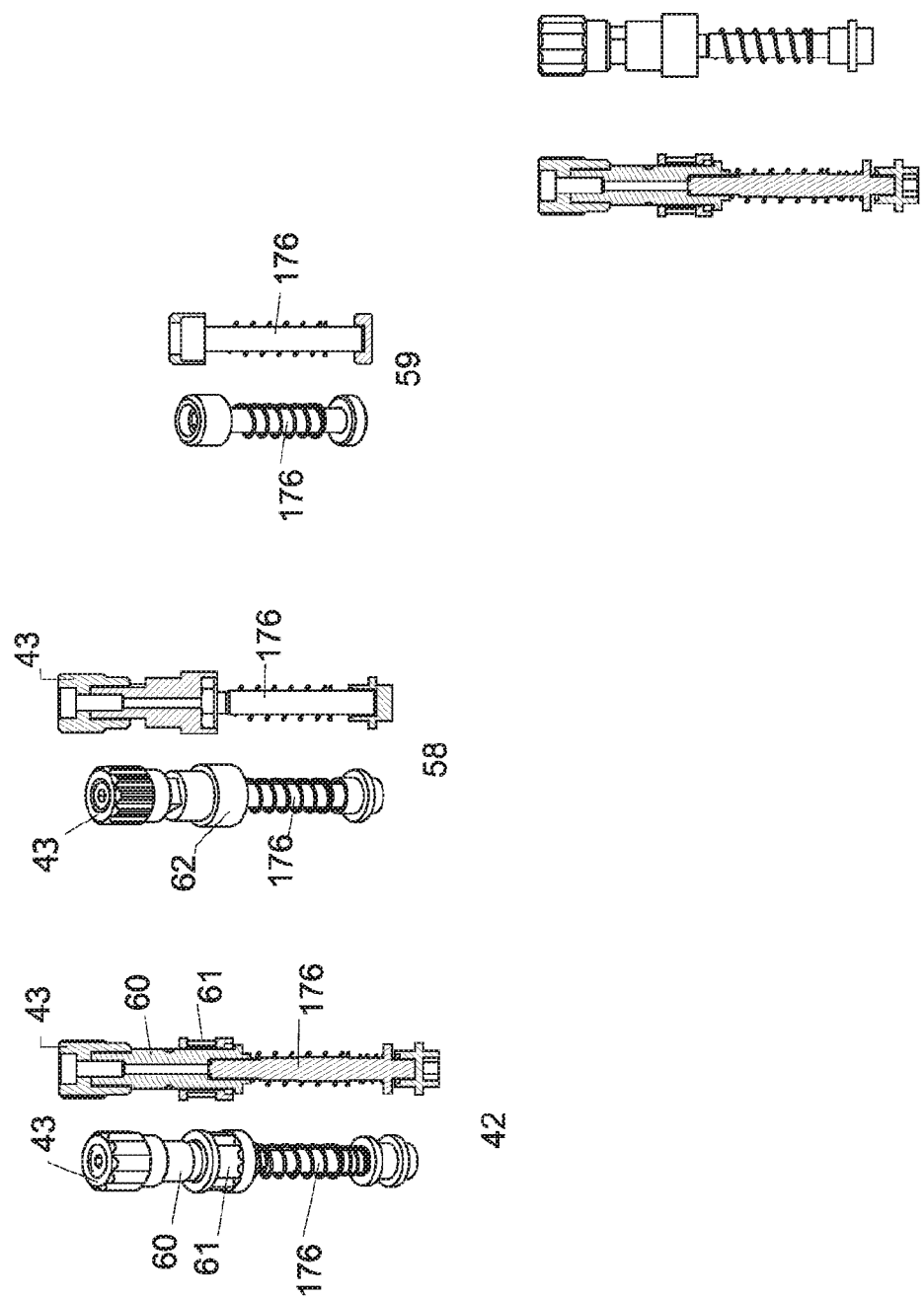

DEVICE AND METHOD FOR PLACING COMPONENTS

RELATED APPLICATIONS

This application is a national phase application of PCT/IB2019/053078, filed Apr. 15, 2019, which claims the benefit of Swiss Patent Application No. 00485/18, filed on Apr. 17, 2018 and Swiss Patent Application No. 01158/19, filed on Sep. 24, 2018. The entire contents of those applications are hereby incorporated by reference.

TECHNICAL FIELD

The present invention relates to a modular device for positioning solutions, for controlling the dimensions and appearance of small parts, by means of manual or automated control apparatuses.

PRIOR ART

Quality control of products, in a laboratory or during their manufacture, often involves an inspection by means of an optical control apparatus. For example, optical control apparatuses of the following types are known:

Standard (analog) profile projectors
Profile projectors with computerized image processing, especially for full-field measurement (without localization constraint) and/or for measuring a part after XY positioning (with localization constraint)
Various microscopes
Various binoculars
X-ray control machines (e.g. Fischerscopes)
Probe instruments (e.g. various roughness meters)
etc.

Depending on the shape of the parts, the geometries to be controlled and also the type of machine used, various methods for positioning the part on the machine are frequently implemented:

free positioning, typically implemented for parts that remain flat and perpendicular to the axis of the optics of the measuring means.
aligned positioning, typically implemented for parts that do not position themselves systematically perpendicular to the axis of the optics or in alignment with the mechanical contact element (for example for cylindrical parts having various diameters, or flat surfaces that are too small to ensure that the part remains in equilibrium).

Positioning supports are frequently used for positioning the parts to be inspected during their inspection by means of an optical inspection apparatus. The known supports are not very flexible and are generally dedicated to one type of machine. They are also generally dedicated to one type of part and offer little flexibility for the positioning of parts of varying shapes. They allow either free positioning or aligned positioning, but generally not both. Finally, the adjustment possibilities for precise positioning of the parts to be inspected, or of each individual part, are limited.

BRIEF SUMMARY OF THE INVENTION

It is an object of the present invention to make available a positioning support for positioning parts during their inspection, which support does not have the limitations of the known supports.

Another object of the invention is to make available a support that is versatile, both in terms of machine compatibility and in terms of the variety of parts to be measured and the possible positions.

Another object of the invention is to make available a support having interchangeable and combinable elements, in order to permit placement configurations that are adapted to varied and complex parts and to optical inspection needs.

Another object of the invention is to make available a support having interchangeable elements in order to permit complex adjustments.

Another object of the invention is to make available a support with which it is possible to increase the quantity of parts that can be positioned per placement.

Another object of the invention is to make available a support that ensures a high degree of precision and repeatability of the positionings.

According to the invention, these objects are achieved in particular by means of a positioning support for the positioning of components to be inspected during their inspection by means of an optical control apparatus, having:

a casing base serving as interface between the optical control apparatus;
a sliding base able to slide along an axis "Y" in a plane of the casing base perpendicular to the optical axis;
a plate able to slide along an axis "X" perpendicular to the axis "Y" in a plane parallel to said plane of the sliding base;
templates or bars for positioning a plurality of components to be measured on said plate.

The components to be measured can be maintained in place by means of holding elements, which are themselves positioned on the plate.

BRIEF DESCRIPTION OF THE FIGURES

Examples of implementation of the invention are set forth in the description and illustrated by the accompanying figures, in which:

FIG. 6 illustrates an example of a fitted plate adapted for aligned measurement.
FIG. 7 illustrates a top view of an example of a fitted sliding plate adapted for aligned measurement.

FIG. 15 illustrates representative views of a transverse bar with points.

FIG. 16 illustrates views of design variants of screwing and of adjustment of the movements in Z.

ILLUSTRATIVE EMBODIMENT(S) OF THE INVENTION

Figure 1:
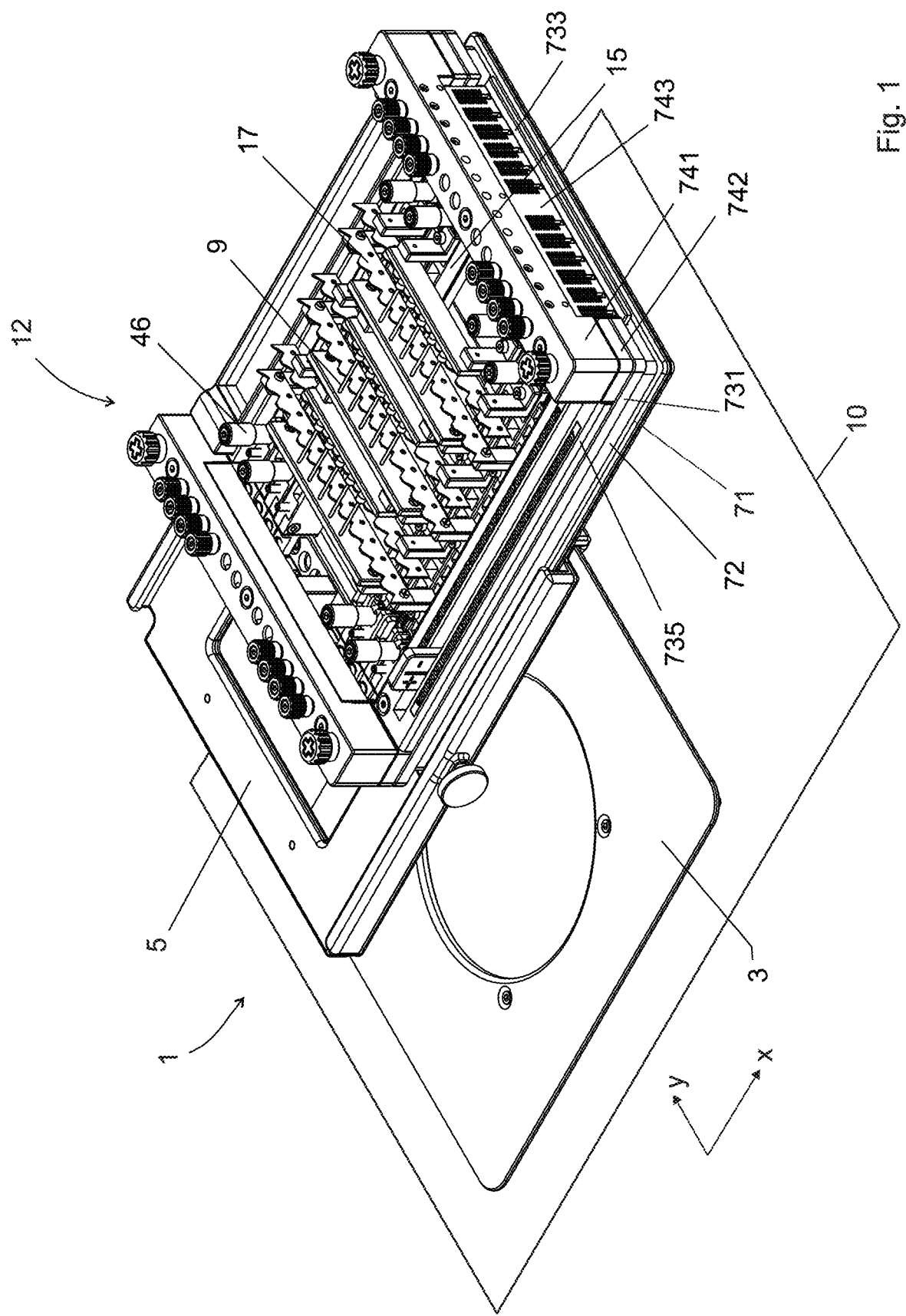
FIG. 1 illustrates a perspective view of an example of a support according to the invention.
Figure 2:
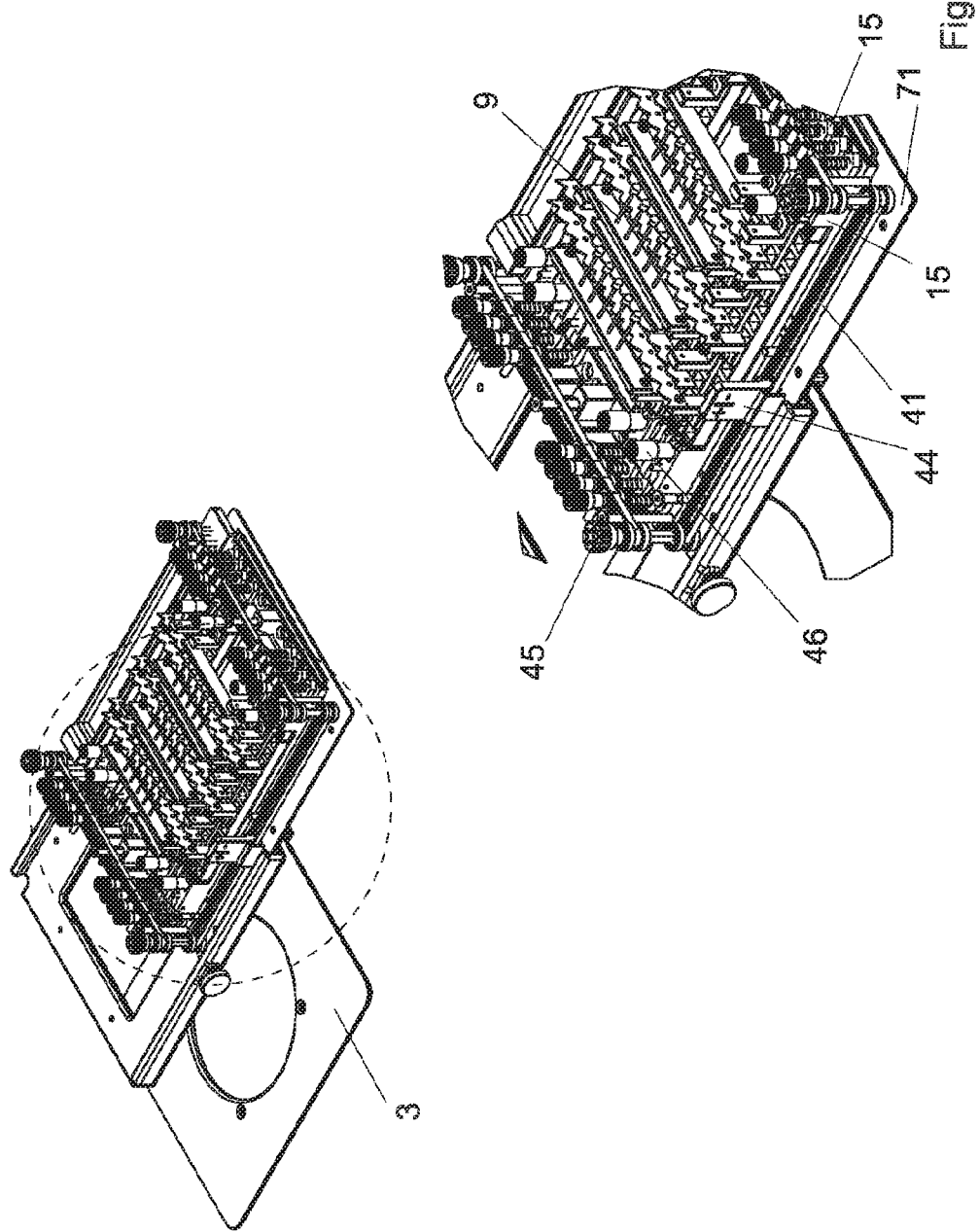
FIG. 2 illustrates a detailed perspective view of an example of a support according to the invention, with enlargement of a circular portion.

An example of a support 1 is illustrated in FIGS. 1 and 2. It comprises, for example, in particular the following components:

Casing Base 3:

(FIG. 3): base that serves as an interface between the optical control apparatus 10 (FIG. 1) and the sliding base 5. The casing base is indexed and centered on the base of the control apparatus 10. The casing base is provided with rows of magnets 48 integrated in removable bars 49 which are fixed by magnetization 27 on each side of the casing base in the direction of sliding of the sliding base 5.

Figure 3:
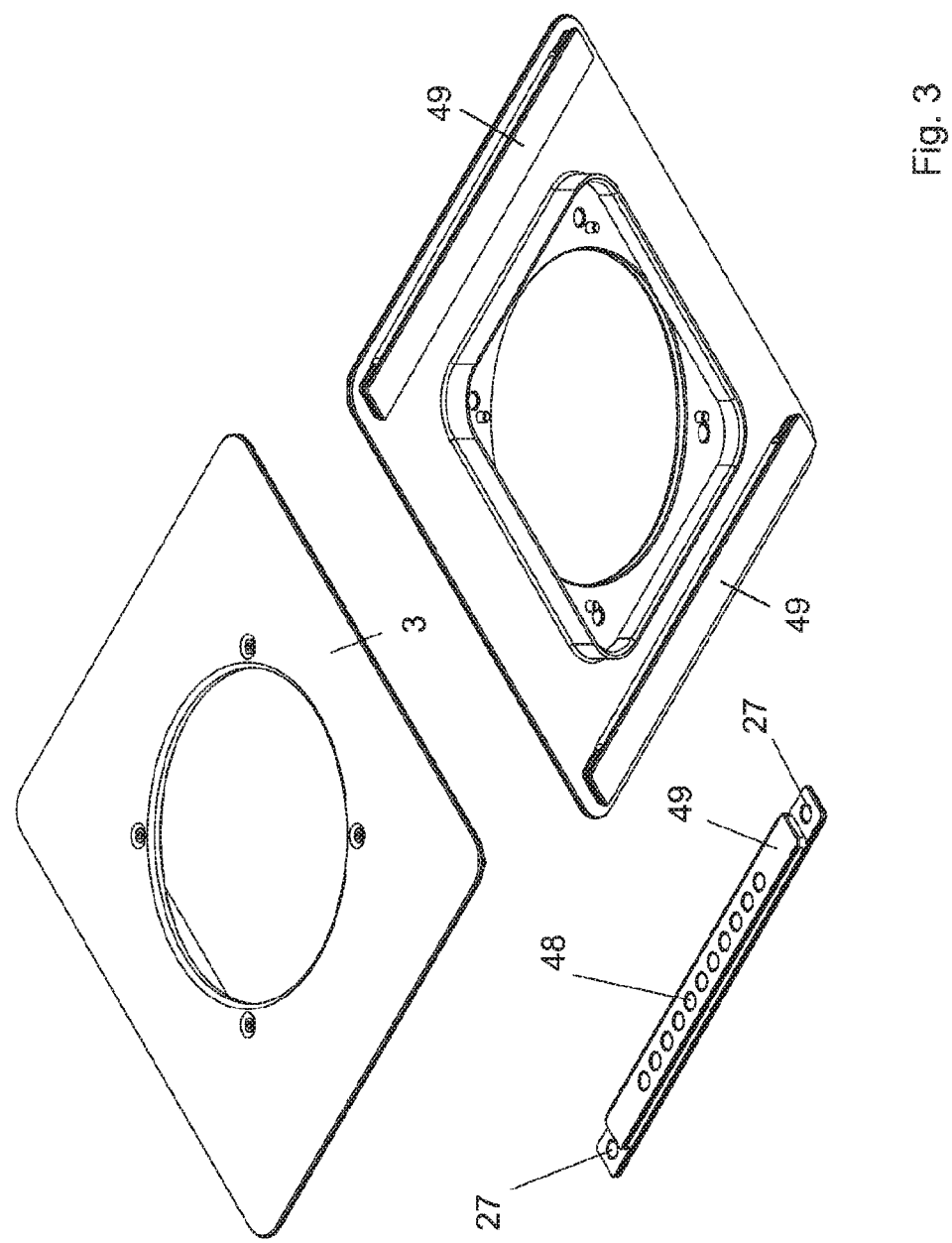
FIG. 3 illustrates a perspective view of an example of a casing base.

Casing bases 3 can be replaced in order to adapt to different control apparatuses. Different casing bases can be made for different types of apparatuses. FIGS. 1 and 3 illustrate a customized base, made for a specific control apparatus, in this case a KEYENCE IM-6140 profile projector. Also conceivable are universal bases which, by a system of "rings" of round and/or square profile, permit adaptation to the profiles of various optical control apparatuses.

Figure 4:
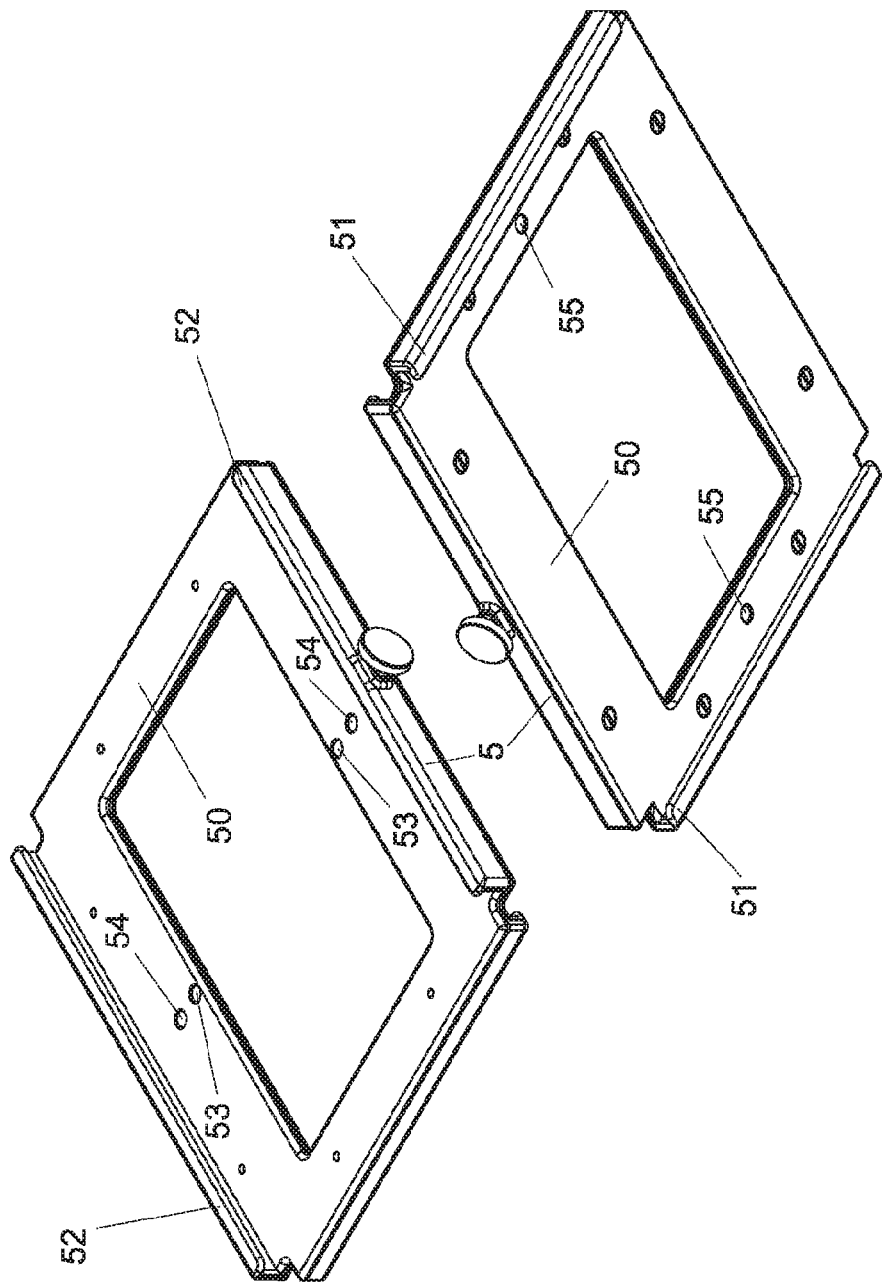
FIG. 4 illustrates a perspective view of an example of a sliding base.

Sliding Base 5 (FIG. 4):

serves as an interface between the casing base 3 and the sliding plate 7. It has the function of sliding along a direction "Y" in the plane of the casing base, that is to say a plane passing through the sliding base perpendicular to the optical axis 12 (FIG. 1) of the optical control apparatus 10.

The sliding base 5 has a frame 50 provided with flaps 51, 52 which serve as slide rails. The lower flaps 51, which deploy on the axis "Y", serve to slide along the casing base 3. The upper rails 52, which deploy along the axis "X", serve for the sliding of the sliding plates 7. Magnets 53, 54, 55 for indexing sliding counter-elements 3, 7 are housed at the center of each of the folded zones or rails, in seats provided for this purpose and visible in FIG. 4. The outer upper magnets 54 (side of the flaps) serve to index the aligned positioning plates. The inner upper magnets 53 (inner frame side) serve to index the free positioning plates. The lower magnets 55 serve for indexing with the various casing bases 3.

It is also possible to replace the flaps 51 with slides on the casing base, in which the frame 50 slides. Similarly, it is possible to replace the flaps 52 with slides on the plate 7, in which the frame 50 slides.

Sliding Plate 7 (FIGS. 1, 2, 7 and 8):

permits sliding along the axis "X" perpendicular to X in the plane of the sliding base 5. It serves for placing there the parts 9 that are to be measured. Different types of interchangeable plates can be mounted on the sliding base 5, depending on the type of positioning, i.e. free or aligned. The size of the plate is advantageously between 13×13 cm and 24×24 cm, for example 15×18 cm. The sliding plates are composed of several levels, preferably four levels. Each level can accommodate different types of components to be selected depending on the desired type of positioning and depending on the complexity of the parts that are to be controlled.

Figure 8:
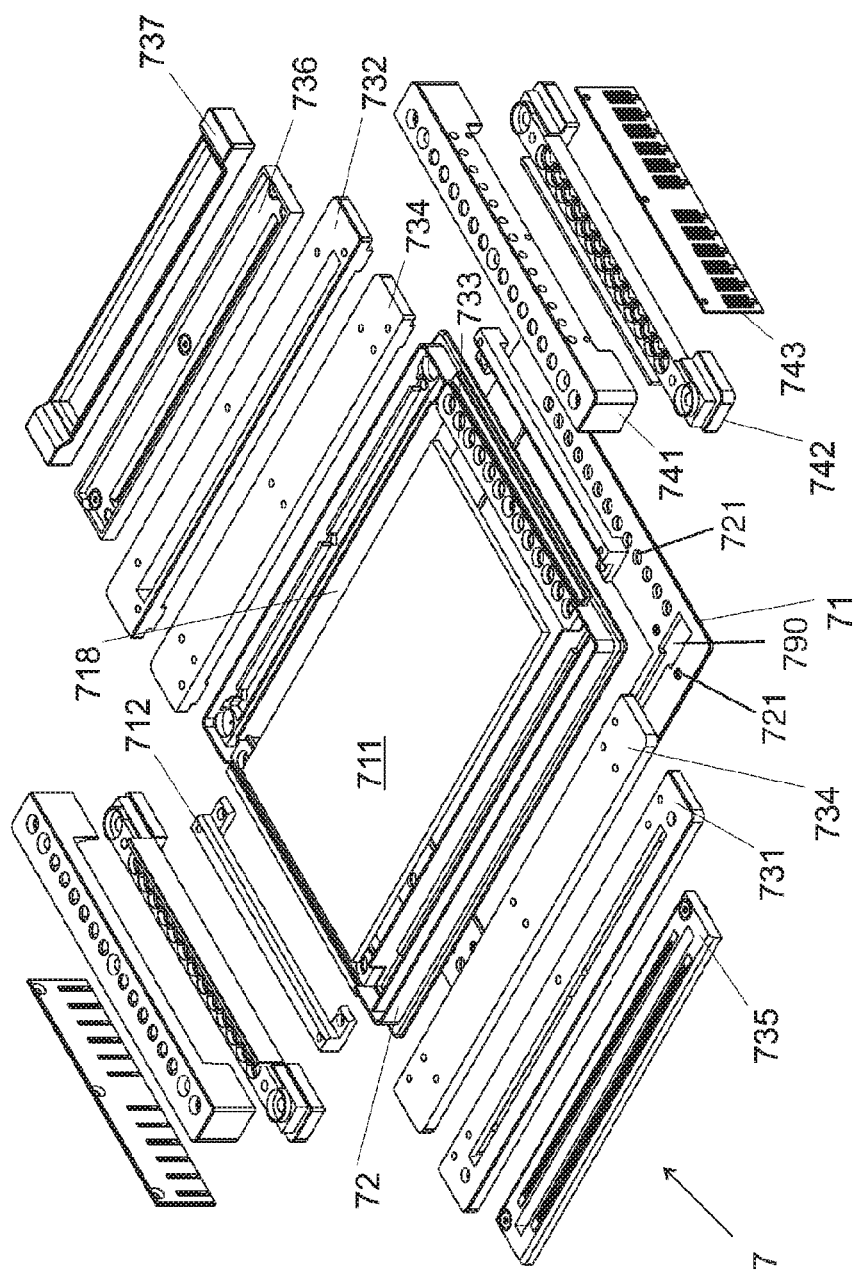
FIG. 8 illustrates an example of the various constituent components of the levels of assembly or composition of a plate.

The first level corresponds to the plate base 71 (FIGS. 2 and 8).

The second level corresponds to the plate frame (FIGS. 6 and 8).

The third level corresponds to the covers of the plate frame (FIG. 8): the standard longitudinal cover 734 serves to close the front and/or rear longitudinal parts of the plate frame when no other cover proves applicable or necessary, for example for the control plates on glass in free positioning (bulk). The front longitudinal cover 731 serves to complete and close the front longitudinal part of the plate frame, when the latter is configured with the synchronous Z adjustment system with longitudinal belt. The metric longitudinal cover 735 serves to cover the longitudinal belt cover, to guide the handle for longitudinal belt displacement, and to indicate the conversion of the distance of the displacement of the adjustment elements in Z, corresponding to the distance of displacement of the longitudinal belt. The rear longitudinal cover 732 serves to close the rear longitudinal part of the plate frame, when the latter is configured with indices for positioning the plate in X. The longitudinal support cover 736 serves to cover the longitudinal cover of the indices X or to cover any other compatible longitudinal cover while serving as a longitudinal tray support. The longitudinal plate tray 26 serves for placing parts there that are to be controlled. The lateral plate cover 733 serves to close the lateral parts of the plate frame, to guide, index, fix or serve as support for the various elements of the Z adjustment system (such as: Z adjustment screws, the stress springs of the longitudinal base bars, the bases serving as pivots for the Z adjustment screws).

The fourth level corresponds to the lateral assembly blocks "Z". The upper part 741 serves to guide, index, fix or serve as support for the various elements of the Z adjustment system (such as: Z adjustment screws, the stress springs of the longitudinal base bars, the end pieces and caps for engaging and screwing of the Z adjustment screws) and the elements of the lateral belt system. The lower part 742 serves to complete and close the upper part of the lateral plate block, especially when the latter is configured with the synchronous Z adjustment system with lateral belts. The metric plate lateral cover 743 serves to indicate the Z displacement distance of the base longitudinal bars.

Figure 5:
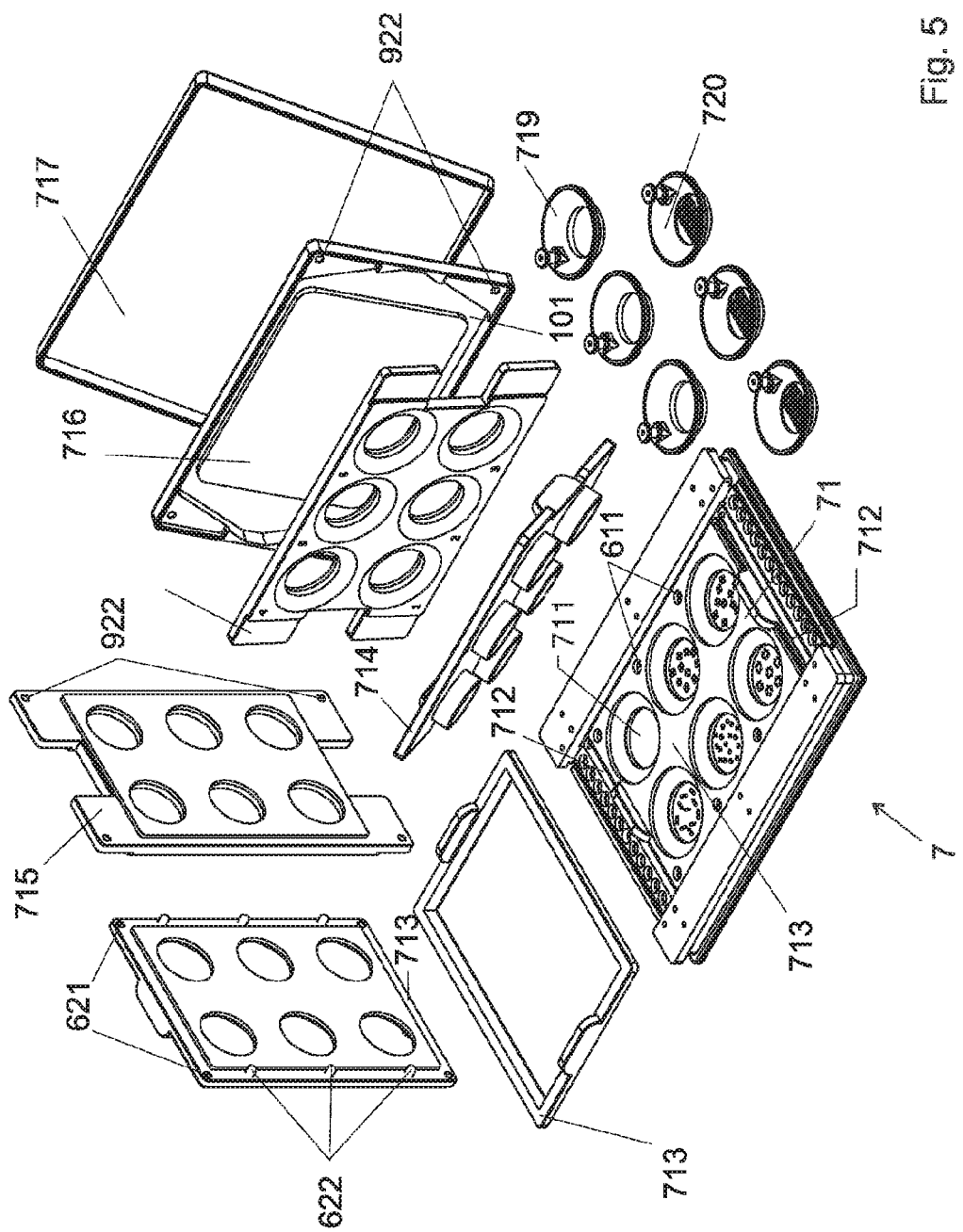
FIG. 5 illustrates an example of a support adapted for bulk measurement.

In the case of free positioning (FIG. 5), the plate 7 advantageously comprises a glass panel 711 and glass panel fixation flanges 712 (FIGS. 5 and 8). Different components can be placed on the glass panel, for example a base segmentation template 713, a grouped funnel template 714 or individual funnel templates without sub-segments 719 or with sub-segments 720 which all serve for inversion and pre-positioning of the parts (5). The template has, for example, six or another number of numbered segments 611 for positioning the components. The base template 713 is chosen from a set of interchangeable templates of various shapes and sizes (depending on the control machine and on the magnification levels used) and fixed to the plate, on the glass panel, by means of magnets 621, in the 4 corners, by magnetization to the glass panel fixation flanges 714. The base templates 713 also have magnets 622 aligned with the segments of the template, such that, in the course of the sliding movements, the latter is indexed with the magnets 53 of the sliding base 5 and therefore with the axis of the optics.

The recovery of the parts placed on the glass panel can be done in bulk, by removing the segmentation template 713 and leaving the parts to slide through a space 718 (FIG. 8) provided between the glass panel and the inner longitudinal edge of the plate 7 in the glazed plate recovery tray 717 (5). Alternatively, the parts can be recovered in a segmented manner, using a reverse template 715 (FIG. 5) which is fixed by magnets 922 at the four corners to the reverse template recovery tray 716. The two elements 715 and 716 are engaged on the base template 713, and the plate is then reversed in such a way that the parts 9 are transferred into the recovery tray 716, respecting the same numbered segmentation 911 as that of the base template. Finally, the removal of the reverse template 715 will again make it possible to recover the parts in bulk, by having them slide in the channels 101 of the recovery tray 716 that are provided for this purpose.

Figure 10:
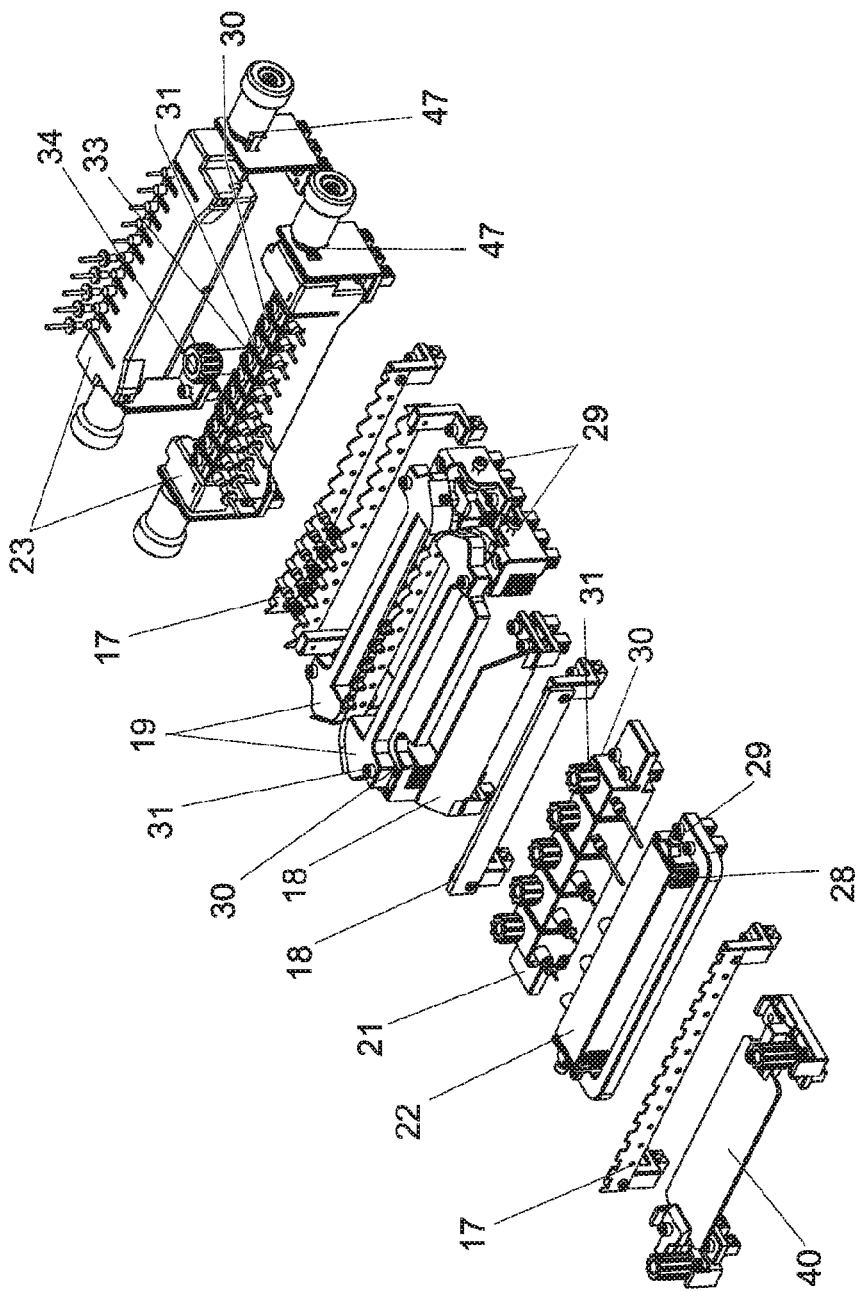
FIG. 10 illustrates different examples of alignment elements: retaining slats, alignment stops, transverse bars with points, thin-slat tension bars, magnetic transverse bars, transverse bars with glass panel.
Figure 11:
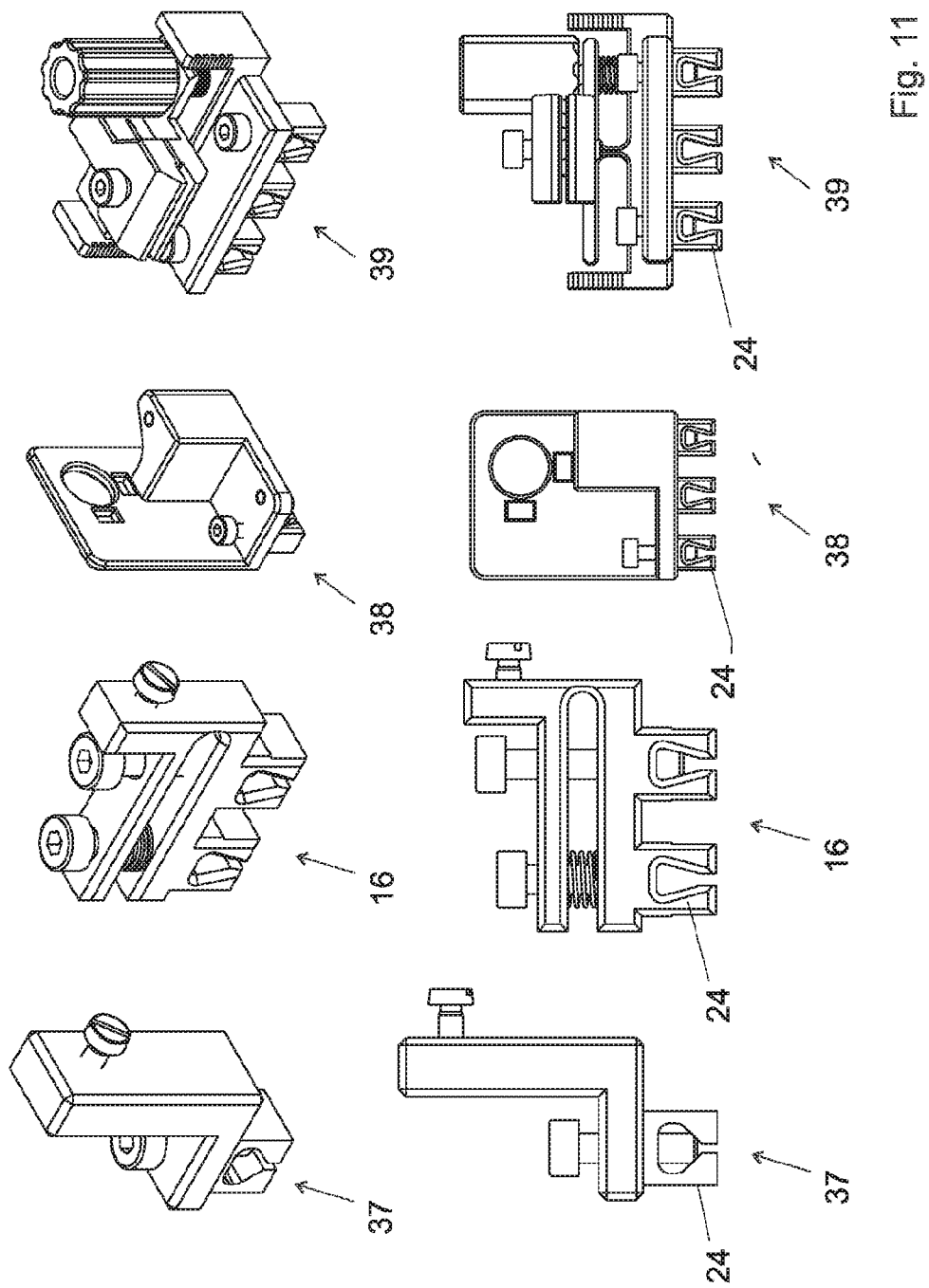
FIG. 11 illustrates different examples of elements (inserts) for attaching the slats and transverse bars.

In the case of an aligned positioning (FIGS. 1, 2, 6 and 7), the plate can have several levels. Each level can be arranged and equipped in a variable manner depending on the complexity of the parts and on the desired positioning and orientation options. For this purpose, the plate can support alignment elements such as: longitudinal bars 15 (FIG. 9), different types of slat fixation inserts 16, 37, 38, 39 (FIG. 11), slats (FIG. 10), abutments 18 (FIG. 10), plaques 40 (FIG. 5) (variants of flat slats, which can also be glazed), indexes (small inserts which are placed on the slats to number the parts and the housing on which they are placed), various transverse bars such as: slat tensioners 19 (FIG. 10), magnetic bars 21, 22 (FIG. 10), bars with points 23 (FIG. 10), vacuum bars (bars with inner tubing opening out on the suction holes, which make it possible to maintain the parts in place by vacuum suction), clamping slat bars (bars with three thin slats pressed together with diamond-shaped holes where the central slat slides between the two others, which, by virtue of their offset, makes it possible to clamp the part passing through them). The bars 15 make it possible to put pieces to be inspected on the slats 17. The abutments 18 then make it possible to block their position in X, for example by sliding a sliding bar with the aid of pushers 46 (elongate cylindrical parts in FIG. 6), or by inclining the support such that all the components bear against such a slat.

The plate base 71 (FIGS. 5 and 7) has a base frame comprising drilled holes 721 serving to align and fix the upper elements. The outer longitudinal part of this frame fits and slides in the upper slide 52 of the sliding base 5. The longitudinal openings 790 serve for the placement of screws or magnets 20 (FIG. 6), which serve to index the plates 7 with the magnets 54 of the sliding base 5.

The plate frame 72 (FIG. 1) can accommodate slides and/or belts 41 (FIGS. 2 and 6) for driving, for example by means of the handle 44 (FIG. 2), and moving the alignment elements 42 (FIG. 6) in Z. The use of belts makes it possible to adjust simultaneously the Z position of several longitudinal bars 15 on the plate. It is also possible to individually select the elements to be coupled to the belt, by vertically actuating the pusher 60 which couples with the pulley 61 (FIG. 16), or to screw them manually, by turning the knurled wheel (FIG. 16). It is also possible to use only the lateral belts, which it will then be possible to actuate by means of the knurled wheel 45 (FIGS. 2, 6 and 7). When using plates with infrequent changes in the Z settings, it is also possible to use no belt and to perform all the screwing procedures individually, either manually with the set of screws 58 (FIG. 16) or using a screwdriver for the screwing assembly 59 (FIG. 16).

Figure 9:
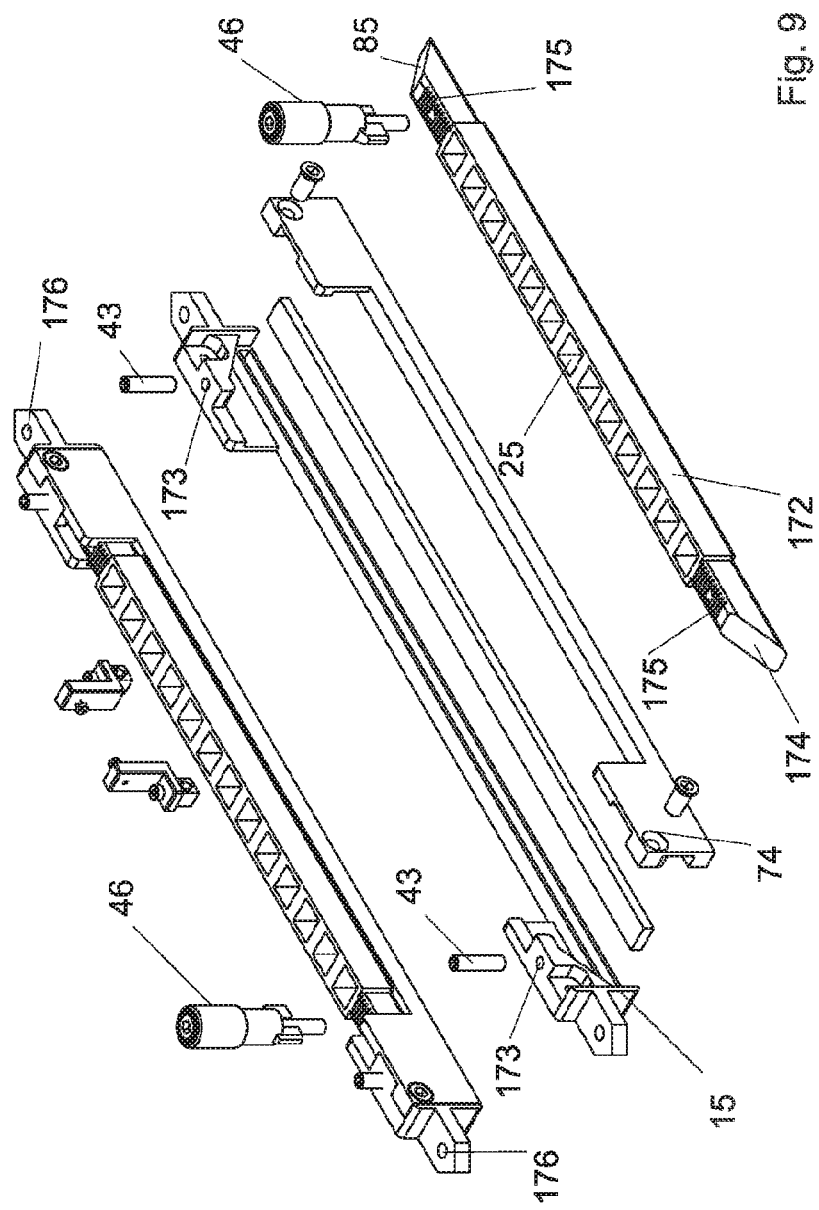
FIG. 9 illustrates an example of a longitudinal bar, having a base bar, a bar pusher, two inserts and a sliding bar.

Longitudinal bars 15 are mounted on the plate 7, for example by being screwed into the lateral covers 733 (FIG. 1), and extend along the axis X. The longitudinal bars 15 serve to adjust the positioning, in a reproducible manner in the axis "X", of the various elements that are fixed there. The longitudinal bars are composed of two main elements: the base bar 171 and the sliding bar 172 (FIG. 9). The fixing of the various elements (inserts 16, 37, 38, 39 and transverse bars 19, 20, 21, 22, 23) on the sliding bar is done by inserting their insertion tabs 24 into the square-profile seats 25 of the sliding bar. After insertion, the final fixing is effected by means of screws that spread the tabs 24 apart in the seats 25. The adjustment of these screws additionally makes it possible to individually adjust the Z position of each element. It is also possible to replace the fixing tabs with a magnetic base that is magnetized in the seats of the sliding bar. The adjustment of the sliding distances or "X" position stresses of the sliding bars is effected by means of screws 43 (9) which pass through the drilled bores 173 of the base bar (FIG. 9) and bear on the angled ends of the sliding bars 174 (FIG. 9). A metric scale 175 makes it possible to visually assess the displacement distance obtained. The displacement of the sliding bars in the axis "Z" is effected by means of screws 176 which fix the longitudinal bars to the plate 7. Several bars can be provided on each edge of the plate 7, as is illustrated in particular in FIGS. 1, 2 and 7.

The alignment elements, in particular the slats 17, make it possible to keep in place the components 9 that are to be inspected visually. They are adjustable in Z (height), in particular by means of rotary pushers with knurled endpieces 43, which are controlled by the mounting screws, allowing manual adjustment of the height Z. For this reason, the adjustment of the longitudinal bars to different heights makes it possible to correct the positioning of the unbalanced parts.

The slatted tensioning transverse bars 19 (FIG. 10) permit great tensioning of thin slats over their entire length, which can be up to more than 100 mm. These tensioners are adjustable in Y, by virtue of spring-action profiles 28 and adjustment screws 29. The perpendicularity, or the parallelism of the slats to the axis Z, is finely adjustable by virtue of the springs 30 and screws 31 placed in the corresponding seats.

The magnetic transverse bars 21 (FIG. 10) allow multiple parts to be held in place magnetically. They can be provided with adapters/reducers in order to reduce or increase the magnetic fields and thus adapt the strength of the magnetic field to the part that is to be held in place. These bars are adjustable in Y by virtue of spring-action profiles 28 and adjustment screws 29. The perpendicularity, or the parallelism of the magnets to the axis Z, is finely adjustable by virtue of the springs 30 and screws 31 placed in the corresponding seats. It should be noted that each magnet is individually adjustable.

The transverse bars with points 23 (FIGS. 10 and 15) allow multiple parts to be held on gauges/pegs. At the individual level, the perpendicularity of the gauges to the axis Z is finely adjustable by virtue of the springs 30 and screws 31 placed in the corresponding seats. At the collective level, the perpendicularity of all the gauges of a bar can be finely adjusted by means of the spring 33 and corresponding screw/knurled wheel 34. A marking or engraving 32 makes it possible to verify the alignment of the various magnet blocks.

The alignment elements are also adjustable in X (length). For this reason, the adjustment of the bars to different distances permits precise positioning of the support zone of the parts.

The alignment elements are also adjustable in Y (depth). For this reason, the alignment of the axis of the positioning zones of the various bars can be finely adjusted and ensured.

The alignment elements are also adjustable in inclination with respect to the axis Z (perpendicularity to the axis). For this reason, the perpendicular alignment of the various holding elements, slats, magnets, gauges, abutment can be finely adjusted and secured.

Alignment elements 47 permit a rotation (FIGS. 10 and 15) and/or a revolution of the parts. For this reason, it is possible to measure parts on various planes.

Each alignment element can accommodate or align one or more components, for example up to 10 components.

For balancing a part (or a row of parts) on slats, a minimum of 2 slats adjusted to two different heights can be provided. This is then designated as a set of slats, supported by two pairs of bars.

The alignment plates can accommodate multiple sets of longitudinal bars, slats or transverse bars.

The alignment plates make it possible to use up to twelve different bars per positioning set for a row of parts. This allows one part to be held and aligned at six different locations per part, ensuring not only the repeatability of the positioning in Z but also X and Y.

Each type of slat can be adjusted to different XYZ positions.

Each of these sets of slats or transverse bars can be multiplied over the available length of longitudinal bars of the alignment plate.

By using more than 2 pairs of longitudinal bars, it is possible to align the parts with abutments 18 (FIGS. 1, 2 and 7), which on the one hand facilitates and accelerates the positioning of the parts and on the other hand ensures the repeatability of their XY alignment.

The bar system is advantageously equipped with accessories (indexes) to identify the numbering of the parts that are in the course of being measured and their acceptance status (or measurement result) while the parts are still on plate.

The alignment plates are supplemented by receptacle covers adapted to each plate for recovery of the parts in one operation (and not part by part), still ensuring the traceability of numbering or segmentation of parts as on the plates.

Cap (CAP):

serves to recover the measured parts with or without compartmentalization. In the case of a free positioning, the recovery of the parts after control is effected by means of a recovery cap engaged on the plate which can be reversed so that the parts fall into the cap. Depending on the requirements, the caps can also contain a replica of the template in order to respect the same distribution of the parts as on the plate. The caps can be lined with damping material such as a thin foam or flexible plastic material.

Figure 12:
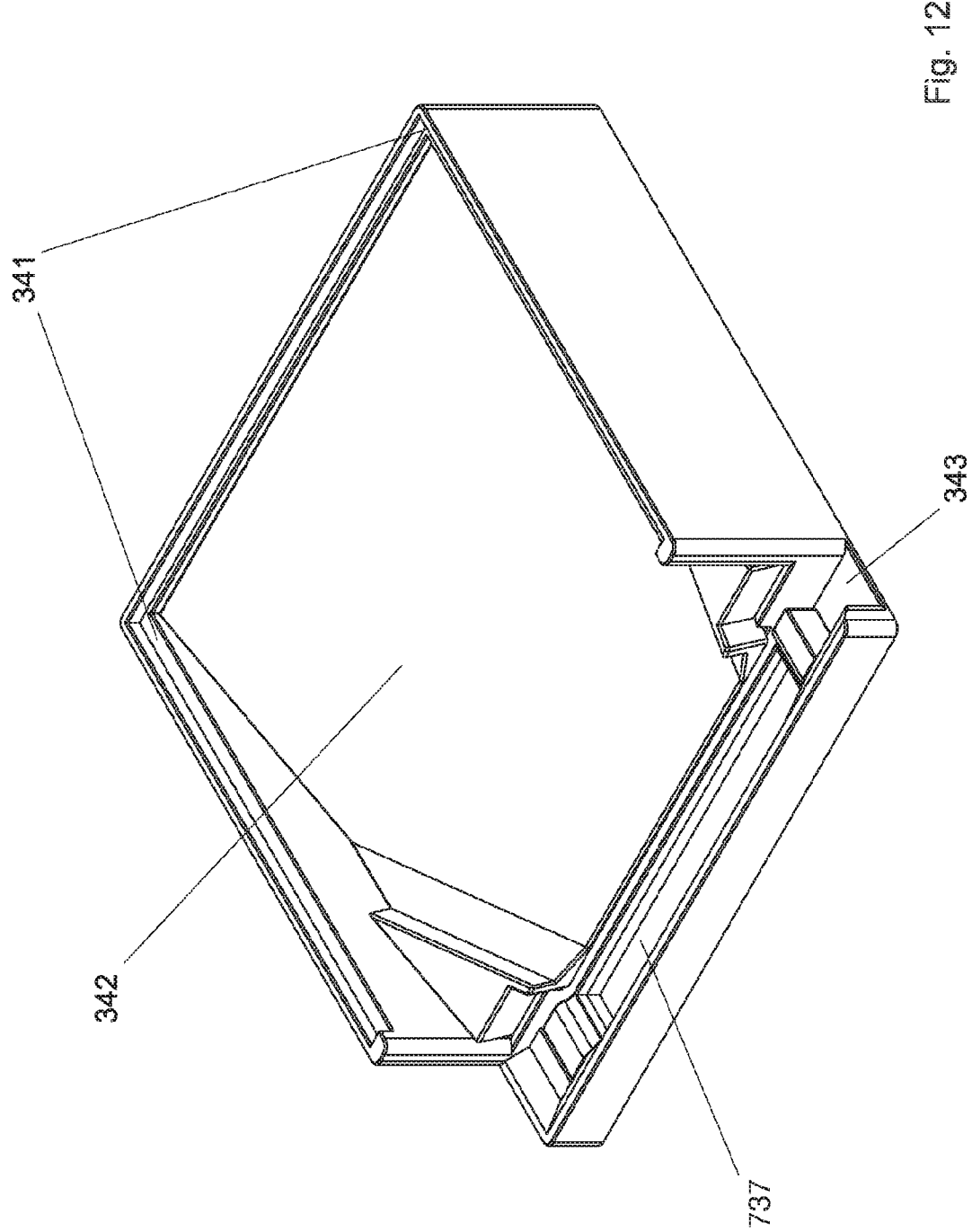
FIG. 12 illustrates a perspective view of an alignment base.
Figure 13:
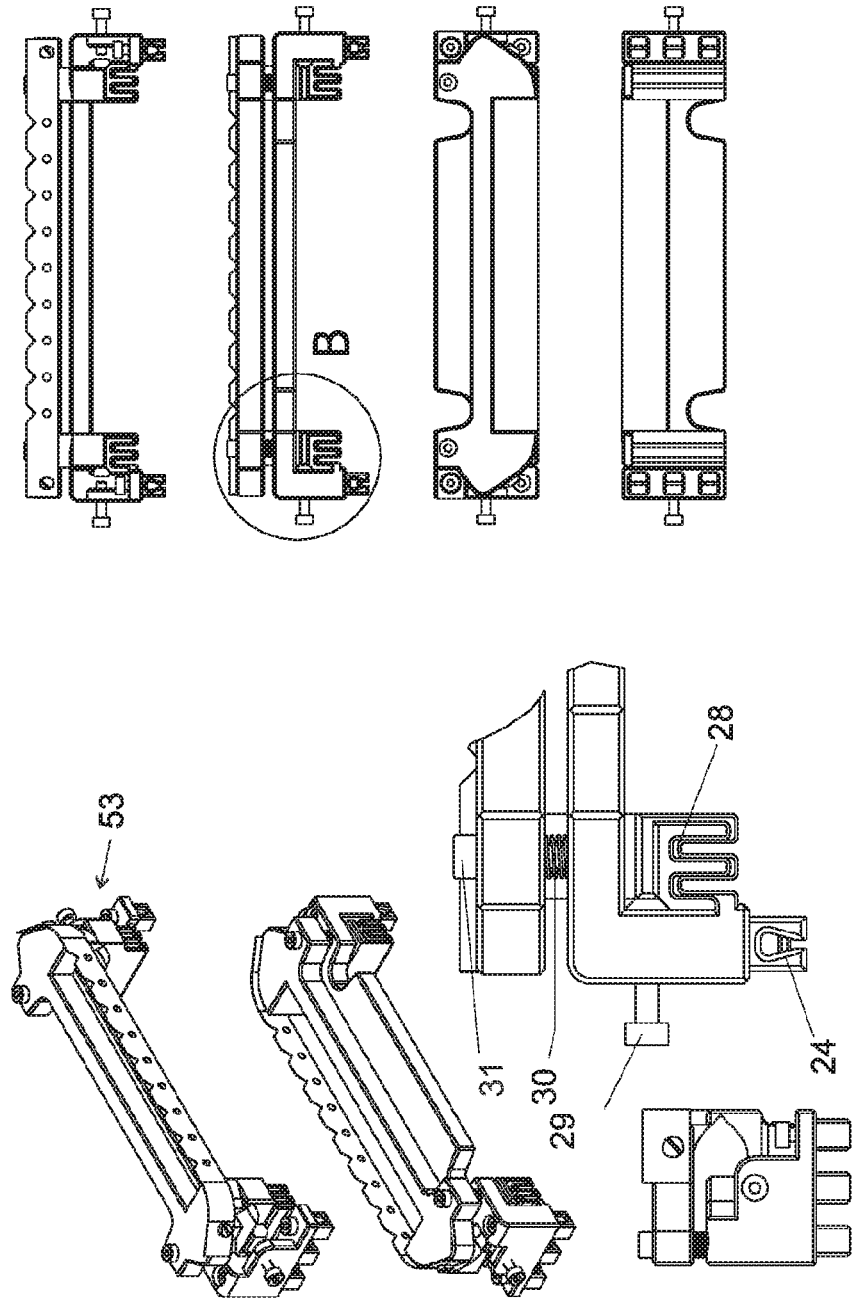
FIG. 13 illustrates representative views of a transverse bar with a slat tensioner.
Figure 14:
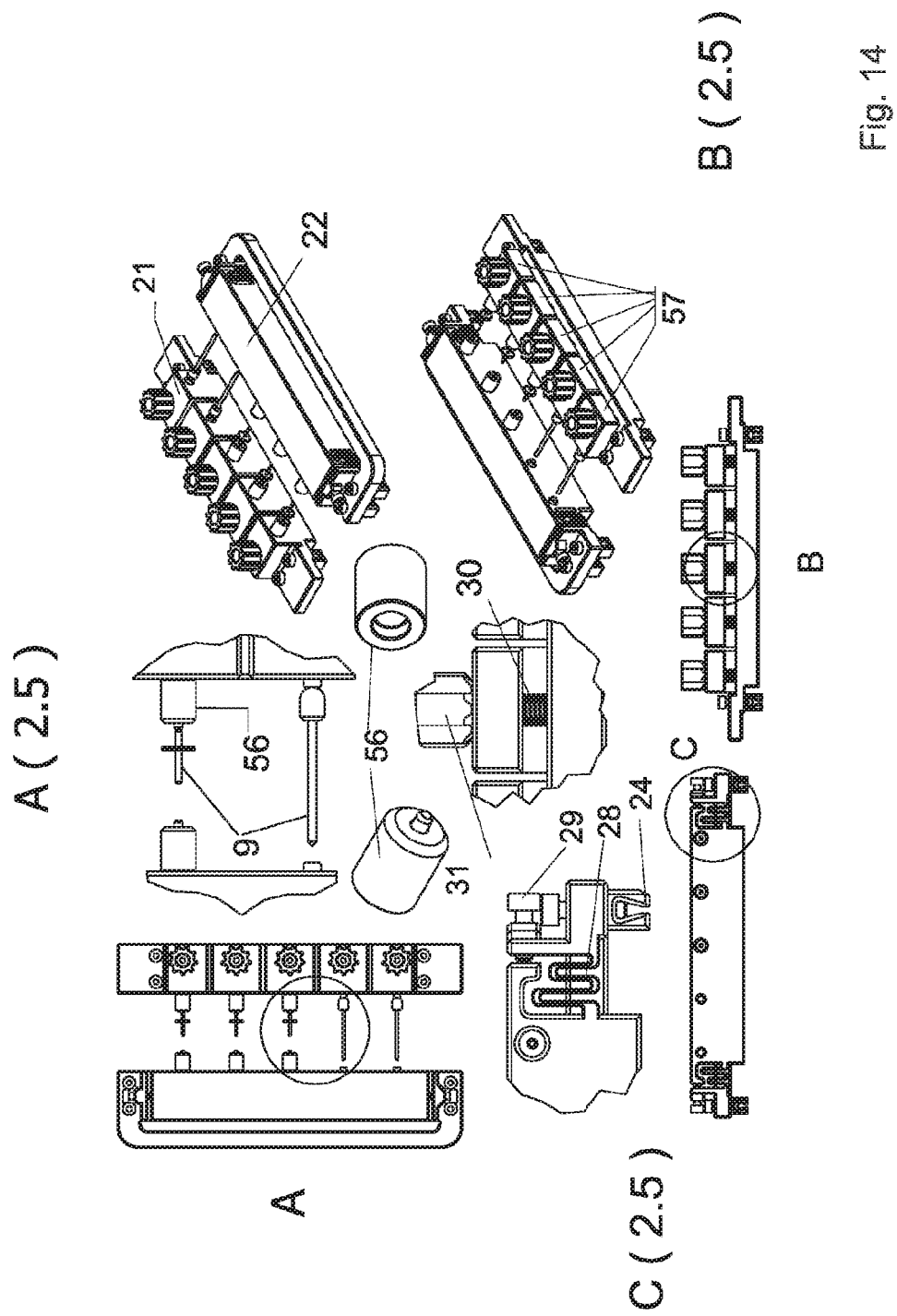
FIG. 14 illustrates representative views of a pair of magnetic or magnetized transverse bars.

Alignment Base (SDA) (FIG. 12):

table base having a plate-holding frame 341, an inclined lower plate 342 and a receptacle for the fallen parts 343. It serves to maintain the sliding plates when aligning the parts and as a support for the operator(s) when placing the parts in position. Any fallen pieces are automatically recovered in longitudinal trays 26 (FIGS. 8 and 12). It is also possible to use the alignment station to recover the parts after control, by tilting the plate so that the parts are tipped onto the inclined panel and they are regrouped in the longitudinal tray.

According to an independent aspect of the invention, software is advantageously provided for indicating where to place the bars and how to adjust them. The software allows the user to determine how to equip the plate, and in particular which elements (bars, alignment elements, pads, etc.) are needed to inspect parts of a given shape, and how these elements should be placed. It also advantageously makes it possible to manage the stock of these components held by a user, for example by determining which element is available and which other element is already mounted on a support among the different supports equipped by the user. By inputting certain basic data concerning the part to be inspected, for example its total length, its diameter 1, its diameter 2, the bearing distance of the first bar and the bearing distance of the second bar, an automatic calculation is performed to indicate the total number of sets that can be placed on the plaque and the exact location "X" of each bar (and also of the successive bars of the plaque) and also the exact height "Z" of each bar. The software advantageously takes account of the user's machine, and in particular its viewing zone, in order to optimize the placement of the elements on a plate.

The system composed of plate, sliding base and casing base can reproduce the operation of a compound sliding table and thus work in palletization, hence with a larger quantity of parts than the base of the machine can initially accommodate.

The system composed of plate and sliding base is provided with a step-by-step movement function which makes it possible to move from one part to another or from one row of parts to another at regular and repeatable steps.

The fact that the alignment plates are interchangeable allows them to be dedicated to a product for its lifetime (production), without having to change the setting each time a part to be controlled is changed.

For all the parts having a flat bearing surface ensuring a perpendicularity to the axis of the optics without support means, the measurement can be performed by pouring them directly onto a control surface. This is referred to as bulk measurement. This system is essentially adapted to the full-field detection mode, in particular in the case of camera-based measuring machines with computer processing of the image.

In this case of bulk measurement, the support advantageously has the following main components:

An interchangeable adapter (casing base) chosen according to the optical control apparatus.

A loading base (sliding base). This is a base that engages with the adapter and serves to receive the plaques for alignment of the parts.

A sliding plate with a glass or sapphire surface that fits into the sliding base.

A template for pre-alignment of the parts, chosen from a set of different templates. These templates make it possible to arrange and distribute the parts on the glass or sapphire plates in as balanced (distributed) a way as possible and to keep them pre-aligned until the time they are measured. The glass zones are thus surrounded, such that the parts cannot roll out of the zones and scatter on the measuring table of the machine. The alignment templates allow prior arrangement of the parts before they are placed on the machine. This allows the parts to be placed more quickly and under better conditions as regards ergonomics and vision. These templates make it possible for the parts previously arranged to be maintained in place during all the manipulations of the plaque and until the time of measurement. The templates also make it possible to prevent/limit displacement of the parts to locations that would be outside the measuring range of the machine.

One or more units (lids/drawers) for recovery of the measured parts. The recovery units make it possible to recover all the parts in a single operation (instead of having to recover them part by part).

In addition to its low cost, this bulk measurement system makes it possible to take full advantage of the full-field measurement methods and to increase the number of parts that are controlled.

The invention claimed is:

1. A positioning support for positioning components to be inspected by an optical control apparatus, having:
    a casing base arranged to be indexed and centered on a base of the optical control apparatus,
    a sliding base able to slide along an axis "Y" in a plane of the casing base perpendicular to an optical axis, the casing base serving as an interface between the optical control apparatus and the sliding base;
    a plate slidably mounted to said sliding base and able to slide along an axis "X" perpendicular to the axis "Y" in a plane parallel to said plane of the sliding base;
    interchangeable modular elements mounted to said plate and configured to position a plurality of components to be measured on said plate.

2. The positioning support as claimed in claim 1, said casing base being chosen from a set of casing bases compatible with different optical control apparatuses.

3. The positioning support as claimed in claim 1, said sliding base having magnets for indexing said sliding base with respect to said casing base, magnets for indexing said plate to said sliding base and magnets for indexing the template.

4. The positioning support as claimed in claim 1, the plate having a frame in which a glass panel is fixed.

5. The positioning support as claimed in claim 4, having a template mounted on said glass panel in order to position the components to be inspected.

6. The positioning support as claimed in claim 5, having magnets for indexing said template with respect to the sliding base.

7. The positioning support as claimed in claim 1, said plate having several levels, wherein each level may be equipped with several variants of interchangeable elements.

8. The positioning support as claimed in claim 7, the lower levels having a base and a frame provided with drilled holes or seats for the removable attachment of the components of the upper levels.

9. The positioning support as claimed in claim 7, the plate supporting interchangeable longitudinal and transverse alignment elements.

10. The positioning support as claimed in claim 9, having a plurality of adjustable bars mounted on the plate so as to extend longitudinally on each side of the plate and making it possible to fix said alignment elements in several selectable positions, the longitudinal position of the bars being adjustable.

11. The positioning support as claimed in claim 10, the upper surface of the bars being provided with seats making it possible to place inserts, fixation tabs or magnetic bases of the alignment elements in selectable locations.

12. The positioning support as claimed claim 10, the alignment elements being adjustable along an axis Z perpendicular to the main plane of the plate and along two X and Y axes parallel to the main plane of said plate.

13. The positioning support as claimed in claim 12, having at least one belt for adjusting the position of said components.

14. The positioning support as claimed in claim 10, the alignment elements being adjustable in inclination with respect to the axis Z.

15. The positioning support as claimed in claim 10, at least some alignment elements permitting a rotation of the components.

16. The positioning support as claimed in claim 7, said interchangeable longitudinal and transverse alignment elements comprising bars, slats, abutment, indexes, or transverse bars.

17. The positioning support as claimed in claim 1, said interchangeable modular elements comprising templates or bars.

* * * * *